N. LJUNGBERG.
COFFEE ROASTER.

No. 179,325.  Patented June 27, 1876.

Witnesses:
Charles D Ford
J Fearnside

Inventor:
Nils Ljungberg
By G. W. Ford Atty

UNITED STATES PATENT OFFICE.

NILS LJUNGBERG, OF ROCKFORD, ILL., ASSIGNOR OF TWO-THIRDS OF HIS RIGHT TO LYON P. ROSS AND WILLIAM T. BROWN, OF SAME PLACE.

IMPROVEMENT IN COFFEE-ROASTERS.

Specification forming part of Letters Patent No. 179,325, dated June 27, 1876; application filed April 21, 1876.

*To all whom it may concern:*

Be it known that I, NILS LJUNGBERG, of Rockford, in the county of Winnebago and State of Illinois, have invented a new and useful Improvement in Coffee-Roasters; and I do hereby declare that the following is a full and exact description of the same, reference being had to the accompanying drawings, and to the letters of reference marked thereon.

Figure 1:
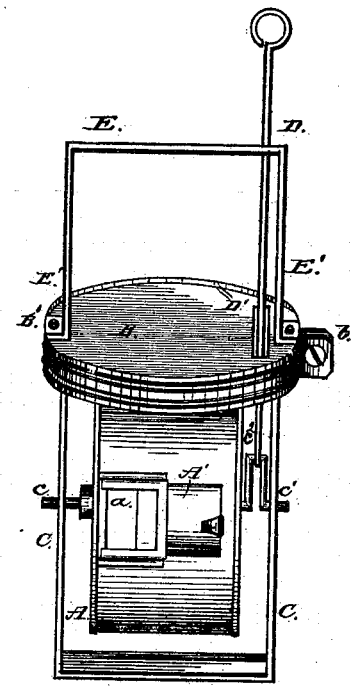
Figure 2:
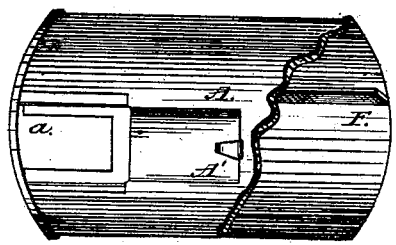

Figure 1 represents a side and partial plan view; and Fig. 2, the cylinder detached, with one side broken away, showing the agitator in the same.

Similar letters of reference show corresponding parts in both figures.

The object of the invention is to provide a cheap and effective device for roasting or browning coffee in the berry in a uniform manner, so as to retain the volatile oils, giving the aroma to the same; and consists of a cylinder having a suitable opening for filling and discharging purposes, pivoted to, and made to revolve within, a metal frame, and so constructed that the said cylinder is wholly beneath the pot-holes and within the fire-chamber of the ordinary cooking-stove, the same being made to revolve within said metal frame, at the will of the operator, by the use of a pitman or rod pivoted to a crank secured to one end of the cylinder, all of which will be hereinafter described.

In the drawings, A represents the cylinder; $A'$, the slide that covers the opening $a$. B represents the top plate, which takes the place of the pot-hole cover, after the same has been removed for the purpose of placing the roaster within the stove. $B'$ is a removable band, secured to the periphery of the cover B, which can be attached or detached, so as to accommodate the cylinder to the different variety of stoves, which may vary in the depth of their respective fire-chambers. $b$ is a screw-bolt passing through ears formed by turning the ends of band $B'$ outward, thus clamping the parts together. C is a metal frame, projecting downward from the under side of top cover B, and within which is hung the cylinder A by journals $c$ $c^1$, the one, $c^1$, being connected with a crank, $c^2$, placed in the space between the inner side of the vertical part of frame C and the cylinder-head. D is a rod or pitman, provided with a suitable handle at the upper end, and hinged or pivoted to the crank $c^2$ at the lower end. $D'$ is an elongated slot in the top B, and through which the rod D oscillates when motion is imparted to the cylinder by the operator. $E'$ are the vertical portions or continuations of frame C, rising above the cover or top B, and are connected together at their upper ends by cross-bar E, which serves as a handle for carrying or holding purposes. F (see Fig. 2) is a metal rib projecting centrally from the inner circumferential part of the cylinder, and extending the entire length of the same. This rib serves as an agitator for breaking up and stirring the mass of coffee as the cylinder is revolved, thus exposing each kernel or berry, bringing them in contact with the more heated portions of the cylinder, and insuring an even roasting or browning of the inclosed material.

The operation is as follows: When it is desired to roast or brown the green berry the slide or door of the cylinder is withdrawn, and a sufficient quantity of coffee is placed within. The door is then closed, the griddle or pot-hole cover is removed from the cooking-stove, and the cylinder is lowered through the opening thus made until the rim $B'$ (or, if the rim is removed, the cover B) rests on the top of the stove, or within the recess formed for holding the griddle, when the operator can, with one hand, steady the implement by grasping the top cross-bar, and with the other hand give the vertical motion to the pitman or rod D, which causes the cylinder to revolve, and thus stir and agitate the coffee, and prevent burning. When the work is finished the slide is withdrawn, and the contents of the cylinder removed to the storing-receptacle.

It will be observed that by this process none of the volatile oils, which give the aroma to the prepared coffee, is allowed to escape when undergoing the heating process necessary to prepare for use.

Having now described my invention, what I desire to secure by Letters Patent is—

1. The cylinder, arranged within the bearing-frame as described, combined with the cylindrical pot-hole cover B and the vertical actuating-rod D, the revolving cylinder being arranged for use within the fire-place of a cooking-stove, substantially as and for the purpose set forth.

2. The revolving cylinder A, made as described, and adapted to be placed within the fire-chamber of a cooking-stove, in combination with the pot-hole cover B, having the elongated slot D', frames E' and C, crank $c^2$, and actuating-rod D, all these parts arranged and operating substantially as described, and for the purpose set forth.

3. In combination with the top plate B, frames C and E' of the removable band B', constructed substantially as described, and for the purpose set forth.

This specification signed and witnessed this 18th day of March, 1876.

NILS LJUNGBERG.

Witnesses:
    G. W. FORD,
    O. G. SCOWLES.